US006416660B1

(12) United States Patent
Zanibelli et al.

(10) Patent No.: US 6,416,660 B1
(45) Date of Patent: Jul. 9, 2002

(54) CATALYTIC COMPOSITION FOR THE UPGRADING OF HYDROCARBONS HAVING BOILING TEMPERATURES WITHIN THE NAPHTHA RANGE

(75) Inventors: Laura Zanibelli, Crema; Marco Ferrari, Milan; Luciano Cosimo Carluccio, San Donato Milanese, all of (IT)

(73) Assignees: Agip Petroli S.p.A., Rome; Enitecnologie S.p.A., San Donato Milanese, both of (IT)

( * ) Notice: Subject to any disclaimer, the term of this patent is extended or adjusted under 35 U.S.C. 154(b) by 0 days.

(21) Appl. No.: 09/466,791

(22) Filed: Dec. 20, 1999

(30) Foreign Application Priority Data

Dec. 22, 1998 (IT) .......................................... MI98A2773

(51) Int. Cl.[7] .............................................. C10G 45/12
(52) U.S. Cl. ...................................... 208/216; 208/217
(58) Field of Search .................................. 208/216, 217

(56) References Cited

U.S. PATENT DOCUMENTS

| | | | |
|---|---|---|---|
| 5,013,423 A | 5/1991 | Chen et al. | 208/64 |
| 5,378,352 A | 1/1995 | Degnan et al. | 208/217 |
| 5,397,455 A | 3/1995 | Timken | 208/60 |
| 5,576,256 A | 11/1996 | Monque et al. | 502/61 |

FOREIGN PATENT DOCUMENTS

| | | | |
|---|---|---|---|
| EP | 0 448 117 A1 | | 9/1991 |
| EP | 795821 | * | 4/1997 |
| EP | 0 796 821 A1 | | 9/1997 |
| WO | WO 94/10262 | | 5/1994 |

OTHER PUBLICATIONS

Roberto Millini, et al., "Zeolite Synthesis in the Presence of Azohia–Spiro Compounds as Structure –Directing Agents", Microporous and Mesoporous Materials 24 (1998) pp. 199–211.

* cited by examiner

*Primary Examiner*—Thuan D. Dang
(74) *Attorney, Agent, or Firm*—Oblon, Spivak, McClelland, Maier & Neustadt, P.C.

(57) ABSTRACT

The present invention relates to a catalytic composition which comprises an ERS-10 zeolite, a metal of group VIII, a metal of group VI and optionally one or more oxides as carrier. According to a preferred aspect, the catalytic composition also contains a metal of group II B and/or III A. The catalytic system of the present invention can be used in the upgrading of hydrocarbon mixtures having boiling ranges within the range of $C_4$ to 250° C., preferably mixtures of hydrocarbons which boil within the naphtha range, containing impurities of sulfur, i.e. in hydrodesulfuration with the contemporaneous skeleton isomerization of olefins contained in these hydrocarbons, the whole process being carried out in a single step.

10 Claims, No Drawings

CATALYTIC COMPOSITION FOR THE UPGRADING OF HYDROCARBONS HAVING BOILING TEMPERATURES WITHIN THE NAPHTHA RANGE

The present invention relates to a catalytic composition which comprises an ERS-10 zeolite, a metal of group VIII, a metal of group VI and optionally one or more oxides as carrier. According to a preferred aspect, the catalytic composition also contains a metal of group II B and/or III A. The catalytic system of the present invention is particularly useful in the upgrading of mixtures of hydrocarbons which boil within the naphtha range containing sulfur impurities, i.e. in hydrodesulfuration with the contemporaneous skeleton isomerization of the olefins contained in these hydrocarbons, the whole process being carried out in a single step. This catalytic system can be used, in particular, for the upgrading of mixtures of hydrocarbons which boil within the naphtha range deriving from cracking processes, preferably mixtures of hydrocarbons having a boiling point within the naphtha range deriving from FCC catalytic cracking (Fluid Catalytic Cracking).

Hydrocarbons which boil within the naphtha range deriving from FCC (i.e. gasoline cut) are used as blending component of gasolines. For this purpose, it is necessary for them to have a high octane number together with a low sulfur content, to conform with the law restrictions which are becoming more and more severe, in order to reduce the emission of pollutants. The sulfur present in gasoline mixtures in fact mainly comes (>90%) from the gasoline cut deriving from FCC.

This cut is also rich in olefins which have a high octane number. Hydrogenation processes used for desulfuration also hydrogenate the olefins present with a consequent considerable reduction in the octane number (RON and MON). The necessity has therefore been felt for finding a catalytic system which decreases the sulfur content in the hydrocarbon mixtures which boil within the naphtha range and, at the same time, minimizes the octane loss (RON and MON), which can be achieved, for example, by the skeleton isomerization of the olefins present.

The use of zeolites with a medium pore dimension as isomerization catalysts and the consequent recovery of octane in the charges already subjected to desulfuration are known (U.S. Pat. Nos. 5,298,150, 5,320,742, 5,326,462, 5,318,690, 5,360,532, 5,500,108, 5,510,016, 5,554,274, 5,99439). In these known processes, in order to obtain hydrodesulfuration with a reduced octane number, it is necessary to operate in two steps, using in the first step catalysts suitable for desulfuration and in the second step catalysts for recovering the octane number.

U.S. Pat. No. 5,378,352 describes a process in a single step for desulfurating hydrocarbon fractions, with boiling points within the range of gasolines, using a catalyst which comprises a metal of group VIII, a metal of group VI, a zeolite selected from ZSM-5, ZSM-11, ZSM-22, ZSM-23, ZSM-35, ZSM-48, ZSM-50, MCM-22 and mordenite, and a metal oxide as ligand, with a process temperature preferably higher than 340° C.

Some catalytic materials containing metals of groups VI and VIII, a refractory carrier and a zeolite selected from ZSM-35, ZSM-5, mordenite and fajasite, are described in EP 442159, EP 437877, EP 434123 for the isomerization and disproportioning of olefins; in U.S. Pat. No. 4,343,692 for hydrodewaxing; in U.S. Pat. No. 4,519,900 for hydrodenitrogenation, in EP 072220 for a process in two steps comprising dewaxing and hydrodesulfuration; in U.S. Pat. No. 4,959,140 for a hydrocracking process in two steps.

We have now surprisingly found a new catalytic system with which it is possible to desulfurate, with high conversion values, mixtures of hydrocarbons that boil within the naphtha range containing sulfur and olefins and contemporaneously obtain the skeleton isomerization of the olefins present. This new catalytic system is also active at temperatures and pressures that are lower than those preferably used in the known art for desulfuration.

Skeleton isomerization enables hydrocarbons to be obtained, which boil within the naphtha range and at the same time with very low RON (research octane number) and MON (motor octane number) losses.

The results obtained do not only relate to the desulfuration of hydrocarbon cuts that boil within the "heavy naphtha" range (130°–250° C.), i.e. cuts poor in olefins, but also feeds of "full range naphtha", which boil within the range of 35°–250° C., i.e. in the case of cuts rich in olefins. In fact, the catalytic system of the present invention has a high selectivity for desulfuration with respect to hydrogenation, which represents an additional advantage in terms of octane recovery in the end-gasoline.

A first object of the present invention therefore relates to a catalytic composition which comprises an ERS-10 zeolite, a metal of group VIII, a metal of group VI, and optionally one or more oxides as carrier.

According to a particular aspect of the present invention, the catalytic composition also comprises a metal of group II B and/or III A. This metal is preferably deposited on the surface of the zeolite.

ERS-10 zeolite is a porous crystalline material described in EP 796821, having in its calcined and anhydrous form a molar composition of oxides corresponding to the following formula:

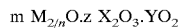

$$m\ M_{2/n}O \cdot z\ X_2O_3 \cdot YO_2$$

wherein m is a number between 0.01 and 10, M is H⁺ and/or a cation of an alkaline or earth-alkaline metal with a valence n, z is a number between 0 and 0.02, X represents one or more elements selected from aluminum, iron, gallium, boron, vanadium, arsenic, antimonium, chromium and manganese and Y represents one or more elements selected from silicon, germanium, titanium, zirconium, characterized by the following X-ray diffraction spectrum from powders (recorded by means of a vertical goniometer equipped with an electronic impulse count system and using CuKa radiation (1=1.54178 A) containing the main reflections indicated in Table A:

TABLE A

| d (Å) | I/I₀ · 100 |
|---|---|
| 11.0 ± 0.1 | vs |
| 6.80 ± 0.08 | w |
| 5.79 ± 0.06 | w |
| 4.59 ± 0.06 | m |
| 4.29 ± 0.05 | vs |
| 3.96 ± 0.04 | m |
| 3.69 ± 0.03 | w |
| 3.41 ± 0.03 | w |
| 3.33 ± 0.03 | w |
| 3.26 ± 0.02 | m |
| 3.07 ± 0.02 | w |
| 2.68 ± 0.01 | w |
| 2.57 ± 0.01 | w |
| 2.51 ± 0.01 | w |
| 2.38 ± 0.01 | w |
| 2.31 ± 0.01 | w |
| 2.28 ± 0.01 | w |

TABLE A-continued

| d (Å) | I/I$_0$ · 100 |
|---|---|
| 2.11 ± 0.01 | w |
| 2.03 ± 0.01 | w |
| 1.94 ± 0.01 | w | wherein d indicates the interplanar distance, I/I$_0$.100 represents the relative intensity calculated by measuring the height of the peaks and percentually relating it to the height of the most intense peak, the symble vs indicates a very strong intensity (60–100), s a strong intensity (40–60), m a medium intensity (20–40) and w a weak intensity (0–20).

M is preferably selected from sodium, potassium, hydrogen or their mixtures. According to a particularly preferred aspect of the present invention the ERS-10 zeolite is in acid form i.e. in the form in which the M cationic sites of the zeolite are prevalently occupied by hydrogen ions. It is especially preferable for at least 80% of the cationic sites to be occupied by hydrogen ions. ERS-10 zeolite based on silicon oxide and aluminum oxide, i.e. an ERS-10 zeolite in which X is aluminum and Y is silicon, is preferably used.

According to an aspect of the present invention, when the catalytic composition comprises ERS-10 zeolite and metals of group VI and VIII, said zeolite is preferably present in a quantity ranging from 70 to 90%; when the catalytic composition also comprises one or more oxides as carrier, said zeolite is preferably present in a quantity ranging from 5 to 30% by weight with respect to the total weight of the catalyst.

The catalysts used in the present invention preferably contain Cobalt or Nickel as metal of group VIII, whereas the metal of group VI is preferably selected from molybdenum or tungsten. According to a particularly preferred aspect, Co and Mo are used. The weight percentage of the metal of group VIII preferably varies from 1 to 10% with respect to the total weight of the catalyst, even more preferably from 2 to 6%; the weight percentage of the metal of group VI preferably varies from 4 to 20% with respect to the total weight of the catalyst, even more preferably from 7 to 13%. The weight percentages of the metal of group VI and the metal of group VIII refer to the content of metals expressed as metal element of group VI and metal element of group VIII; in the end-catalyst the metals of group VI and VIII are in the form of oxides. According to a particularly preferred aspect, the molar ratio between the metal of Group VIII and the metal of group VI is less than or equal to 2, preferably less than or equal to 1.

The oxide used as carrier is preferably the oxide of an element Z selected from silicon, aluminum, titanium, zirconium and mixtures of these. The carrier of the catalytic composition can consist of one or more oxides and the oxide used is preferably alumina or alumina mixed with an oxide selected from silica and zirconia.

When the catalyst contains a metal of group II B and/or III A, said metal is preferably present in a quantity ranging from 0.1 to 5% by weight of the total weight of the catalyst, expressed as metal element, even more preferably between 0.1 and 3%. Zinc is preferably used.

The catalytic compositions of the present invention can be prepared with traditional methods, for example by impregnation of the ERS-10 zeolite with a solution containing a salt of a metal of group VI and a salt of a metal of group VIII, drying and calcination. The impregnation can also be effected using a solution containing a salt of a metal of group VI and a solution containing a salt of a metal of group VIII.

By means of impregnation of a solution containing a salt of a metal of group II B and/or III A, catalytic compositions can be prepared which contain, in addition to the zeolite, metal of group VI and metal of group VIII, also a metal of group II B and/or III A.

When the catalyst contains one or more oxides as carrier it can be prepared by mixing the zeolite with the oxide, followed by extrusion, calcination, an optional exchange process which reduces the sodium content, drying, impregnation with a solution containing a salt of a metal of group VI, drying, calcination and impregnation with a solution of a salt of a metal of group VIII, drying and calcination.

According to a particularly preferred aspect of the present invention, the catalytic compositions which contain one or more oxides as carrier are prepared by means of the sol-gel technique as follows:

a) an alcoholic dispersion is prepared, containing a soluble salt of the metal of group VIII, ERS-10 zeolite and one or more organic compounds capable of generating the supporting oxide or oxides;

b) an aqueous solution is prepared containing a soluble salt of the metal of group VI and, optionally, tetraalkylammonium hydroxide having the formula R$_4$NOH;

c) the alcoholic dispersion and the aqueous dispersion are mixed and a gel is obtained;

d) aging of the gel at a temperature ranging from 10 to 40° C.;

e) drying of the gel;

f) calcination of the gel.

The catalytic compositions thus obtained have a high surface area (>200 m$^2$/g) and a high pore volume (>0.5 cm$^3$/g) with a distribution within the mesoporosity range.

In step a) of this preparation, the metal salt of group VIII is, for example, a nitrate, a hydroxide, an acetate, an oxalate, and preferably a nitrate. When a catalytic composition also containing a metal of group II B and/or III A is desired, a salt of this metal will also be present in the alcoholic dispersion.

The organic compound capable of generating the supporting oxide or oxides, by means of hydrolysis and subsequent gelations and calcination, is preferably the corresponding alkoxide or alkoxides, in which the alkoxide substituents have the formula (R'O)— wherein R' is an alkyl containing from 2 to 6 carbon atoms. The alkoxide is preferably an element Z selected from silicon, aluminum, titanium, zirconium and their mixtures; in particular, when Z is aluminum, it is a trialkoxide having the formula (R'O)$_3$Al, wherein R' is preferably an isopropyl or a sec-butyl; when Z is silicon, it is a tetraalkoxide having the formula (R'O)$_4$Si wherein R' is preferably ethyl and, when Z is Zr, it is an alkoxide having the formula (R'O)$_4$Zr wherein R' is preferably isopropyl.

In step b) the soluble salt of the metal of group VI can be an acetate, an oxalate or ammonium salts, and is preferably an ammonium salt. The tetraalkylammonium hydroxide has the formula R$_4$NOH wherein R is an alkyl group containing from 2 to 7 carbon atoms. According to a preferred aspect the solution in step b) also contains formamide (Drying Control Chemical Agent) which favours the stabilization of the porous structure during the drying phase.

The quantities of the reagents are selected in relation to the composition of the end-catalyst.

In step c), according to the preferred sequence, the solution of step b) is added to the suspension of step a).

In step d) the gel obtained is maintained at a temperature ranging from 10 to 40° C., for a time of 15–25 hours.

Step e) is carried out at a temperature ranging from 80 to 120° C.

Step f) is carried out at a temperature ranging from 400 to 600° C.

According to another aspect of the present invention, the catalytic system containing one or more oxides as carrier can be prepared as follows:

- a) an alcoholic dispersion is prepared, containing ERS-10 zeolite and one or more organic compounds capable of generating the supporting oxide or oxides;
- b) an aqueous solution is prepared containing tetraalkylammonium hydroxide having the formula $R_4NOH$;
- c) the alcoholic dispersion and the aqueous dispersion are mixed and a gel is obtained;
- d) aging of the gel at a temperature ranging from 10 to 40° C.;
- e) drying of the gel;
- f) calcination of the gel;
- g) impregnation of the calcined product with a solution containing a salt of a metal of group VI, drying, calcination and impregnation with a solution of a salt of a metal of group VIII, drying and calcination.

The quantities of the reagents are selected in relation to the composition of the end-catalyst. The reagents used are the same as the sol-gel synthesis.

According to another aspect of the present invention, the catalytic compositions containing the supporting oxide or oxides can be prepared as follows:

- a) an alcoholic dispersion is prepared, containing a soluble salt of the metal of group VIII and one or more organic compounds capable of generating the supporting oxide or oxides;
- b) an aqueous solution is prepared containing a soluble salt of the metal of group VI and, optionally, tetraalkylammonium hydroxide having the formula $R_4NOH$;
- c) the alcoholic dispersion and the aqueous dispersion are mixed and a gel is obtained;
- d) aging of the gel at a temperature ranging from 10 to 40° C.;
- e) drying of the gel;
- f) mechanical mixing of the dried product with ERS-10zeolite;
- g) calcination.

The reagents used are the same as the sol-gel synthesis.

The quantities of the reagents are selected in relation to the composition of the end-catalyst.

The latter preparation is that preferably used for the synthesis of the catalytic composition of the present invention which also contains a metal of group II B and/or III A deposited on the surface of the zeolite.

In this case, in step f) an ERS-10 zeolite is used, on whose surface a metal of group II B and/or III A has been deposited by impregnation, using the known techniques. The ERS-10 zeolite thus modified is new and is a particular aspect of the present invention.

According to another aspect of the present invention, the catalytic compositions containing one or more oxides as carrier can be prepared as follows:

- a) impregnation of the carrier, consisting of one or more oxides, with a salt of a metal of group VI and with a salt of a metal of group VIII,
- b) drying and calcination of the material obtained in step a),
- c) mixing of the impregnated oxide obtained in step b) with the ERS-10 zeolite.

The quantities of the reagents are selected in relation to the composition of the end-catalyst.

The impregnations of step a) are carried out with any traditional method, the salts of metals of groups VI and VIII are in aqueous solution. When separate aqueous solutions for the metal of group VI and for the metal of group VIII, are used, a drying and calcination step can be inserted between the two impregnations. Before step c) the impregnated oxide can be ground and sieved into particles of <0.2 mm and then, in step c), mixed with the zeolite by physical mixing or dispersing the particles in an organic solvent of the cyclohexane or cyclohexanol type. The solvent is vaporized and the particles of catalyst dried and calcined. The mixing of step c) can also be carried out by mixing and homogenizing a solid mixture comprising the impregnated oxide (with particle dimensions of <0.2 mm), the zeolite, a ligand and, optionally, combustible organic polymers.

The mixture thus obtained can be mixed with a peptizing acid solution, extruded and calcined with any traditional method. Alternatively, the paste can be pelletized, dried and calcined with any traditional method.

The catalysts used in the process of the present invention can be used as such or, preferably, extruded according to the known techniques, for example using a peptizing agent, such as a solution of acetic acid, and optionally a ligand of the pseudobohemite type, added to the catalyst to form a paste which can be extruded. In particular, when the catalysts are prepared by sol-gel, the addition of the ligand is not necessary during the extrusion process.

The materials of the present invention can be used as catalysts for the upgrading of hydrocarbon mixtures which boil within the naphtha range, and even more generally within the range $C_4$ and 250° C.

A further object of the present invention therefore relates to a hydrodesulfuration process of hydrocarbon mixtures having boiling ranges within the range of $C_4$ to 250° C., containing olefins and at least 150 ppm of sulfur, with the contemporaneous skeleton isomerization of these olefins, effected with hydrogen in the presence of a catalytic composition which comprises an ERS-10 zeolite, a metal of group VIII, a metal of group VI, and optionally one or more oxides as carrier. According to a particular aspect of the present invention the catalytic composition also comprises a metal of group II B and/or III A, preferably deposited on the surface of the zeolite.

When the catalytic composition containing the ERS-10 zeolite, a metal of group VI, a metal of group VIII, and optionally a metal of group II B and/or III A, is used, the process of the present invention is carried out at a temperature ranging from 220 to 360° C., preferably between 300 and 350° C., at a pressure ranging from 5 to 20 kg/cm$^2$, at a WHSV ranging from 1 to 10 hours$^{-1}$. The quantity of hydrogen is between 100 and 500 times the quantity of hydrocarbons present (Nl/l).

When the catalytic composition also contains one or more oxides as carrier, the hydrodesulfuration process and contemporaneous skeleton isomerization of the olefins present is carried out at a temperature ranging from 220 to 320° C., preferably between 250 and 290° C., at a pressure ranging from 5 to 20 kg/cm², and a WHSV between 1 and 10 hours⁻¹. The quantity of hydrogen is between 100 and 500 times the quantity of hydrocarbons present (Nl/l).

The hydrocarbon mixture which can be desulfurated according to the present invention contains more than 150 ppm of sulfur. For example hydrocarbon mixtures with a sulfur content of more than 600 ppm, or even higher than 10,000 ppm can be subjected to hydrodesulfuration.

The hydrocarbon mixtures which are subjected to hydrodesulfuration according to the process of the present invention are mixtures having boiling ranges within the range of $C_4$ to 250° C., $C_4$ referring to the boiling temperature of a mixture of hydrocarbons with four carbon atoms. Mixtures of hydrocarbons which boil within the naphtha range, i.e. having boiling ranges within the range of $C_5$ to 220° C., are preferably subjected to hydrodesulfuration.

The catalysts of the present invention are activated, before use, by sulfidation according to the known methods. According to a particular aspect of the present invention, it is possible to effect the desulfuration and isomerization process in a reactor in which the catalytic composition is divided in two beds, the first containing the ERS-10 zeolite, which may optionally contain a metal of group II B and/or III A, the second containing the remaining catalytic component containing a metal of group VI, a metal of group VIII and one or more oxides as carrier.

The following examples describe different preparations of catalysts of the present invention and upgrading tests on both the model charge and on full range naphtha from FCC. An ERS-10 zeolite in acid form, prepared as described in example 1 of EP 796821, having a molar ratio $SiO_2/Al_2O_3$=67, is used in all the examples.

EXAMPLE 1

Preparation of Catalyst A 1.185 g of $Co(NO_3)_2.6H_2O$ (CON) are dissolved in 36.18 g of BuOH, at room temperature. 0.74 g of ERS-10 zeolite are added, which are suspended in the alcoholic solution, heating to 60° C. for 10 minutes. 31.8 g of $Al(OC_4H_9)_3$ (Aluminum sec-butoxide) are added to this suspension which is heated to 80° C. for 20 minutes, obtaining suspension A1.

1.66 g of $(NH_4)_6Mo_7O_{24}.4H_2O$ (Ammonium heptamolybdate, AHM) are dissolved in 19.41 g of $(C_3H_7)_4NOH$ (Tetrapropylammonium hydroxide, solution at 19.2%), at room temperature, obtaining solution A2 (pH=10). Solution A2 is slowly poured into the suspension A1, under heating and under stirring, obtaining a gel which is maintained at 80° C. for 1 hour (pH=10). This is followed by aging at room temperature for 22 hours, drying in a vacuum oven at 100° C. for 6 hours, calcination in muffle with the following temperature program: heating to 200° C. (5° C./min); a pause at 200° C. for 2 hours; heating to 550° C. (5° C./min); a pause at 550° C. for 3 hours; spontaneous cooling to room temperature. The characteristics of the material are indicated in Table 1.

EXAMPLE 2

Preparation of Catalyst B 1.33 g of CON are dissolved in 36.19 g of BuOH, at room temperature. 2.05 g of ERS-10 zeolite are added, which are suspended in the alcoholic solution, heating to 60° C. for 10 minutes. 31.7 g of $Al(OC_4H_9)_3$ (Aluminum sec-butoxide) are added to this suspension which is heated to 80° C. for 20 minutes, obtaining a suspension B1.

1.59 g of AHM (Ammonium heptamolybdate) are dissolved in 19.35 g of $(C_3H_7)_4NOH$ (Tetrapropylammonium hydroxide, solution at 19.2%), at room temperature, obtaining the solution B2 (pH=10).

The solution B2 is slowly poured into the suspension B1, under heating and under stirring, and the procedure described in example 1 is then followed. The characteristics of the material are indicated in Table 1.

EXAMPLE 3

Preparation of Catalyst C 6.5 grams of ERS-10 zeolite are impregnated with an aqueous solution containing 1.07 g of CON and 1.48 g of AHM in 10.35 g of distilled $H_2O$, having pH=5. The impregnated product is left to rest in air, at room temperature, for 23 hours, is then dried in an oven at 100° C., for 6 hours and calcined in muffle as described in example 1. The characteristics of the material are indicated in Table 1.

EXAMPLE 4

Preparation of Catalyst D 0.88 g of CON are dissolved in 33.55 g of BuOH, at room temperature. 0.99 g of ERS-10 zeolite are added, which are suspended in the alcoholic solution, heating to 50° C. for 10 minutes. 28.07 g of $Al(OC_4H_9)_3$ (Aluminum sec-butoxide) are added to this suspension which is heated to 60° C. for 20 minutes, obtaining a suspension D1.

1.29 g of AHM (Ammonium heptamolybdate) are dissolved in 8.89 g of $H_2O$, at room temperature; 1.39 g of $HCONH_2$ (Formamide) are then added, obtaining the solution D2 (pH=5). The solution D2 is poured into the suspension D1 and the procedure described in example 1 is then followed. The characteristics of the material are indicated in Table 1.

EXAMPLE 5

Preparation of Catalyst E 0.74 g of ERS-10 zeolite are dispersed in 36.18 g of BuOH, heating to 50° C. for 10 minutes. 32.25 g of $Al(OC_4H_9)_3$ (Aluminum sec-butoxide) are added to this suspension which is heated to 60° C. for 20 minutes, obtaining the suspension E1.

18.81 g of $(C_3H_7)_4NOH$ (Tetrapropylammonium hydroxide, solution at 19.2%, solution E2, pH=14) are slowly added to the suspension E1, under heating and under stirring, obtaining a gel which is maintained at 80° C. for 1 hour (pH=13). This is followed by aging at room temperature for 21 hours, drying in a vacuum oven at 100° C. for 6 hours, calcination as in example 1. An aliquot of the calcined product (7.68 g) is impregnated with a solution containing 1.185 g of CON and 1.75 g of AHM in 10.9 ml of $H_2O$ (pH=5); this is followed by digestion for 22 hours in air.

The impregnated product is dried in an oven at 100° C. for 6 hours and calcined as described in example 1. The characteristics of the material obtained are indicated in Table 1.

EXAMPLE 6

Preparation of Catalyst F 1 gram of ERS-10 zeolite is impregnated with an aqueous solution containing 0.135 g of $Zn(NO_3)_2.6H_2O$ in 1.59 g of distilled $H_2O$, having pH=6. The impregnated product is left to rest in air, at room temperature, for 16 hours; it is then dried in an oven at 100° C., for 6 hours and calcined in muffle as described in example 1. The characteristics of the material obtained, containing 3.6% by weight of zinc oxide, are indicated in Table 1.

EXAMPLE 7

Preparation of Catalyst G 1.185 g of CON are dissolved in 42.5 g of iPrOH, at room temperature. 2.985 g of a solution at 70% of $Zr(OC_3H_7)_4$ (zirconium isopropoxide) and 31.9 g of $Al(OC_4H_9)_3$ (Aluminum sec-butoxide) are added and the mixture is heated to 60° C. for 20 minutes, obtaining the suspension G1.

1.66 g of AHM (Ammonium heptamolybdate) are dissolved in 18.77 g of $(C_3H_7)_4NOH$ (Tetrapropylammonium hydroxide, solution at 20%), at room temperature, obtaining the solution G2, pH=11.

The solution G2 is slowly poured into the suspension G1, under heating and under stirring, obtaining a slurry which is maintained at 80° C. for 1 hour (pH=10). This is followed by aging at room temperature for a night and drying in a vacuum oven at 100° C. for 6 hours.

8 g of the catalyst thus dried are mechanically mixed in a ball mill with 3.43 g of ERS-10 zeolite and the mixture is then calcined as in example 1. The characteristics of the material obtained are indicated in Table 1.

EXAMPLE 8

Preparation of Catalyst H 1.18 g of CON are dissolved in 53.505 g of BuOH, at room temperature. 1.14 g of $Si(OC_2H_5)_4$ (Tetraethylorthosilicate) and 29.92 g of $Al(OC_4H_9)_3$ (Aluminum sec-butoxide) are added and the mixture is heated to 60° C. for 20 minutes, obtaining the suspension H1.

1.76 g of AHM (Ammonium heptamolybdate) are dissolved in 18.3 g of $(C_3H_7)_4NOH$ (Tetrapropylammonium hydroxide, solution at 20%), at room temperature, obtaining the solution H2, pH=10.

The solution H2 is slowly poured into the suspension H1, under heating and under stirring, obtaining a slurry which is maintained at 80° C. for 1 hour (pH=10). This is followed by aging at room temperature for a night and drying in a vacuum oven at 100° C. for 6 hours.

8.27 g of the dried product are mechanically mixed in a ball mill with 3.505 g of ERS-10 zeolite and the mixture is calcined as in example 1. The characteristics of the material obtained are indicated in Table 1.

EXAMPLE 9

Preparation of Catalyst K 1.04 g of CON are dissolved in 47.16 g of BuOH, at room temperature. 1.03 g of $Si(OC_2H_5)_4$ (Tetraethylorthosilicate) and 26.53 g of $Al(OC_4H_9)_3$ (Aluminum sec-butoxide) are added and the mixture is heated to 60° C. for 10 minutes, obtaining the suspension I1.

1.47 g of AHM (Ammonium heptamolybdate) are dissolved in 17.56 g of $(C_3H_7)_4NOH$ (Tetrapropylammonium hydroxide, solution at 19.2%), at room temperature, obtaining the solution I2, pH=11.

The solution I2 is poured into the suspension I1 and the same procedure is then followed as in example 1. The characteristics of the resulting material, called material I, are indicated in Table 1.

A catalytic composition, called K, is prepared by mechanically mixing material I with ERS-10 zeolite containing Zn prepared as in example 6 (catalyst F). The catalytic composition K contains F in a quantity equal to 30% by weight of the total weight of the catalyst.

EXAMPLE 10

Comparative

Preparation of Catalyst L 1.18 g of CON are dissolved in 42.52 g of iPrOH, at room temperature. 2.99 g of a solution at 70% of $Zr(OC_3H_7)_4$ (Zirconium isopropoxide) in iPrOH and 30 g of $Al(OC_4H_9)_3$ (Aluminum sec-butoxide) are added and the mixture is heated to 60° C. for 20 minutes, obtaining the suspension L1.

1.66 g of AHM (Ammonium heptamolybdate) are dissolved in 19.06 g of $(C_3H_7)_4NOH$ (Tetrapropylammonium hydroxide, solution at 19.2%), at room temperature, obtaining the solution L2, (pH=11).

The solution L2 is poured into the suspension L1 and the same procedure is followed as in example 1. The characteristics of the material are indicated in Table 1.

EXAMPLE 11

Comparative

Preparation of Catalyst M 1.18 g of CON are dissolved in 36.17 g of BuOH, at room temperature. 0.63 g of ZSM-5 zeolite (PQ, $SiO_2/Al_2O_3$= 32.3, in acid form) are suspended under heating (60° C., for 10 minutes, pH=7) and 30.11 g of $Al(OC_4H_9)_3$ (Aluminum sec-butoxide) are added; the mixture is heated to 60° C. for 20 minutes, obtaining the suspension M1.

1.67 g of AHM (Ammonium heptamolybdate) are dissolved in 19.41 g of $(C_3H_7)_4NOH$ (Tetrapropylammonium hydroxide, solution at 19.2%), at room temperature, obtaining the solution M2, pH=10. The solution M2 is slowly poured into the suspension M1, under heating and under stirring, obtaining a gel which is maintained under heating (80° C. for 1 hour, pH=9). This is followed by aging at room temperature for 22 hours, drying in a vacuum oven at 100° C. for 6 hours and calcining as in example 1. The characteristics of the material obtained are indicated in Table 1 below.

TABLE 1

| Catalyst | ERS-10 weight % | Co (weight %) | Mo (weight %) | Co/Mo | Surf. Area $(m^2/g)$ | Pore vol. $(cm^3/g)$ |
|---|---|---|---|---|---|---|
| A | 8.2 | 2.6 | 9.6 | 0.45 | 380 | 1.19 |
| B | 19.9 | 2.5 | 8.1 | 0.51 | 430 | 1.24 |
| C | 81.4 | 2.5 | 10.1 | 0.41 | 61 | 0.41 |
| D | 10.3 | 2.2 | 8.7 | 0.41 | 375 | 1.09 |
| E | 8.1 | 2.3 | 10.3 | 0.41 | 335 | 0.59 |
| F | 96.4 | — | — | — | 160 | 0.59 |
| G | 30.0 | 2.7 | 10.0 | 0.43 | 315 | 0.74 |
| H | 29.8 | 2.0 | 8.0 | 0.41 | 370 | 0.69 |
| I | — | 2.3 | 8.9 | 0.43 | 360 | 0.74 |
| L | — | 2.2 | 8.5 | 0.45 | 290 | 0.74 |
| M | — (7.4 ZSM-5) | 2.8 | 10.5 | 0.45 | 410 | 1.05 |

Catalytic Tests on Model Charge

The catalytic results obtained by treating a feed, defined as model charge, representative of the composition of an FCC gasoline in terms of S content and olefinic cut, are provided hereunder. The model charge has the following composition:

30% by weight of 1-pentene;

0.25% by weight of thiophene (1000 ppm S);

the complement to 100 is n-hexane.

The catalysts are all activated following the same procedure, in a stream of $H_2S/H_2$.

The catalytic activity is evaluated as follows:

HDS conversion: $100 \times (ppm\ S_{in} - ppm\ S_{out})/ppm\ S_{in}$

ISO isomerizing property:

$100 \times (i\text{-pentanes} + i\text{-pentenes})/\Sigma C_5$

HYD hydrogenating property:

$100 \times (n\text{-pentane}_{out}/1\text{-pentene}_{in})$

EXAMPLE 12

Catalytic Activity of Catalyst A 1.5 g of catalyst A, diluted with corundum, are charged into a reactor (30–50 mesh) and activated in the presence of $H_2S/H_2$ (10% vol) up to 400° C. for 3 hours; the system is then brought under $H_2$ pressure up to 10 bars and the model feed is sent, with a ratio $H_2/HC$ equal to 300 Nl/l. The operating conditions and catalytic results are indicated in Table 2.

EXAMPLE 13

Catalytic Activity of Catalyst B 1.5 g of catalyst B are treated as in example 9 as regards the activation procedure and then tested on the model charge under the operating conditions described in Table 2. Table 2 also indicates the catalytic results.

EXAMPLE 14

Catalytic Activity of Catalyst D 1.5 g of catalyst D are treated as in example 9. The operating conditions and catalytic results are indicated in Table 2.

EXAMPLE 15

Catalytic Activity of Catalyst E 1.5 g of catalyst E are treated as in example 9. The operating conditions and catalytic results are indicated in Table 2.

EXAMPLE 16

Catalytic Activity of Catalyst G 1.5 g of catalyst G are treated as in example 9. The operating conditions and catalytic results are indicated in Table 2.

EXAMPLE 17

Catalytic Activity of Catalyst H 1.5 g of catalyst H are treated as in example 9. The operating conditions and catalytic results are indicated in Table 2.

EXAMPLE 18

Comparative

Catalytic Activity of Catalyst I 1.5 g of catalyst I, not containing a zeolitic component, are treated as in example 9. The operating conditions and catalytic results are indicated in Table 2.

EXAMPLE 19

Comparative

Catalytic Activity of Catalyst L 1.5 g of catalyst L, not containing a zeolitic component, are treated as in example 9. The operating conditions and catalytic results are indicated in Table 2.

EXAMPLE 20

Comparative

Catalytic Activity of Catalyst M 1.5 g of catalyst M, containing ZSM-5 as catalytic component, are treated as in example 9. The operating conditions and catalytic results are indicated in Table 2.

TABLE 2

| Catalyst | T (° C.) | WHSV (hr$^{-1}$) | H$_2$/HC Nl/l | HDS (%) | ISO (%) | HDS/HYD | HYD/ISO |
|---|---|---|---|---|---|---|---|
| A | 254 | 3.7 | 323 | 97.4 | 12.9 | 1.4 | 5.4 |
|   | 295 | 7.8 | 314 | 99.9 | 19.9 | 1.5 | 3.3 |
| B | 297 | 9.8 | 300 | 99.6 | 28.5 | 1.9 | 1.8 |
|   | 280 | 9.8 | 300 | 98.4 | 19.8 | 1.7 | 2.9 |
| D | 295 | 8.5 | 300 | 99.5 | 20.7 | 1.5 | 2.6 |
| E | 255 | 3.9 | 300 | 97.2 | 10.2 | 1.3 | 7.9 |
| G | 256 | 3.9 | 300 | 80.1 | 15.5 | 1.9 | 2.7 |
|   | 287 | 3.9 | 300 | 99.9 | 28.0 | 2.2 | 1.6 |
| H | 256 | 4.2 | 300 | 84.8 | 11.0 | 2.0 | 3.8 |
|   | 287 | 4.2 | 300 | 99.5 | 23.0 | 1.8 | 2.5 |
| I | 252 | 1.6 | 300 | 92.8 | 2.4 | 1.0 | 40.0 |
|   | 282 | 6.6 | 300 | 91.0 | 2.5 | 1.0 | 91.0 |
| L | 251 | 1.8 | 150 | 96.0 | 2.7 | 1.3 | 27.3 |
|   | 253 | 3.3 | 300 | 96.0 | 2.7 | 1.2 | 27.6 |
| M | 254 | 3.3 | 380 | 40.3 | 13.3 | 0.7 | 4.5 |
|   | 282 | 3.9 | 313 | 87.7 | 15.7 | 1.7 | 3.3 |

From the the data provided in Table 2, it can be seen that under the same reaction conditions, intended as the result of the combination of the operating variables, the catalysts of the present invention allow much higher desulfuration conversions to be obtained than those with a catalytic composition containing a different zeolite from ERS-10 zeolite (catalyst M). In particular at low temperatures (250–256° C.), conversion values are obtained which are at least the double of those obtained with the catalytic composition containing ZSM-5. At these temperatures, with the comparative catalyst M, an isomerization is obtained which is comparable to that obtained with the catalysts of the present invention, whereas at higher temperature (280–297° C.), the isomerization values obtained with the catalysts of the present invention are much higher than those obtained with the catalytic composition of the prior art containing ZSM-5 zeolite. Comparative catalysts I and L, which do not contain zeolite, have high conversion values for desulfuration but have a negligible isomerization capacity. In addition, under the same reaction conditions, the catalysts of the present invention have a greater selectivity for the isomerization of the charge, with respect to the hydrogenation of the olefins, as can be demonstrated by comparing the values indicated in the column HYD/ISO of Table 2.

EXAMPLE 21

Catalytic Activity of Catalyst C 1.5 g of catalyst C are treated as in example 9 as regards the activation procedure and then tested on the model charge under the following operating conditions:
T=336° C.
WHSV=4.8 hours$^{-1}$
H$_2$/HC=300 Nl/l The following catalytic results are obtained:
HDS (%): 89.4
ISO (%): 61.5
HDS/HYD: 8.6
HYD/ISO: 0.2

From the above data it can be seen that at high temperatures the catalyst C, in addition to having a good desulfurating capacity, has a very high performance in terms of isomerizing capacity and contemporaneous reduced hydrogenating activity (HYD/ISO=0.2), thus keeping a tight check, in the case of the desulfuration treatment of FCC gasolines, on the decrease in the octane number.

Catalytic Tests on Real Charge

Some examples are provided hereunder of the performance of catalysts of the present invention evaluated on Full Range FCC gasoline having the composition and characteristics indicated in Table 3 below:

TABLE 3

| S ppm | MON | n + i- paraf. | naphthenes | n + i- olef. | cyclo-olefins | aromatics | B.P. > 200° C. |
|---|---|---|---|---|---|---|---|
| 1.360 | 80.7 | 20.4 | 9.4 | 30.3 | 5.6 | 24.8 | 8.9 | wherein S ppm is the sulfur content and the third to the seventh column indicate the volume percentage of normal and iso paraffins, naphthenes, normal and iso olefins, cyclo-olefins, aromatics, respectively. The last column indicates the volume percentage of the fraction which boils over 200° C.

EXAMPLE 22

1.5 g of catalyst C, diluted with corundum, are charged into a reactor (30–50 mesh) and activated in the presence of H$_2$S/H$_2$ (10% vol) up to 400° C. for 3 hours; the system is then brought under H$_2$ pressure up to 10 bars and the feed consisting of the full range FCC gasoline of Table 3 is sent, with an H$_2$/HC ratio of 300 to 500 Nl/l.

The treatment conditions and results obtained, expressed as characteristics and composition of the resulting gasoline are indicated in the table below:

| S ppm | MON | T (° C.) | WHSV (hr$^{-1}$) | H$_2$/ charge | n + i- paraffins | naph-thenes | n + i- olefins | cyclo-olefins | aromat-ics | B.P. > 200° C. |
|---|---|---|---|---|---|---|---|---|---|---|
| 459 | 80.6 | 350 | 4.4 | 500 | 24.1 | 9.5 | 27.8 | 4.9 | 24.1 | 8.8 |
| 359 | 80.6 | 350 | 4.4 | 300 | 25.4 | 9.4 | 27.3 | 5.0 | 23.7 | 8.6 |

EXAMPLE 23

2.2 g of the catalytic composition K, diluted with corundum, are charged into a reactor (30–50 mesh) and activated in the presence of H$_2$S/H$_2$ (10% vol) up to 400° C. for 3 hours; the system is then brought under H$_2$ pressure up to 10 bars and the feed consisting of the full range FCC gasoline of Table 3 is sent, with an H$_2$/HC ratio equal to 300 Nl/l. The process conditions and results obtained are shown in the following table:

| S ppm | MON | T (° C.) | WHSV (hr⁻¹) | H₂/ charge | n + i- paraffins | naph- thenes | n + i- olefins | cyclo- olefins | aromat- ics | B.P. > 200° C. |
|---|---|---|---|---|---|---|---|---|---|---|
| 131 | 79.0 | 287 | 4.8 | 300 | 32.7 | 11.0 | 19.2 | 3.7 | 25.1 | 11.2 |
| 85 | 78.7 | 287 | 4.8 | 300 | 34.2 | 11.7 | 18.0 | 3.5 | 25.0 | 11.0 |

0.6 g of ERS-10 and 1.4 g of material I are charged in a reactor (30–50 mesh) into two distinct beds: ERS-10 zeolite is charged into the first and the material I into the second. The ERS-10 zeolite forms 30% of the total weight of the catalyst.

The activation is effected as in the previous examples and the FCC gasoline having the composition indicated in Table 3 is then sent.

The process conditions and results are specified in the following table:

| S ppm | MON | T (° C.) | WHSV (hr⁻¹) | H₂/ charge | n + i- paraffins | naph- thenes | n + i- olefins | cyclo- olefins | aromat- ics | B.P. > 200° C. |
|---|---|---|---|---|---|---|---|---|---|---|
| 176 | 80.3 | 287 | 4.5 | 300 | 27.9 | 10.7 | 23.6 | 4.1 | 24.0 | 9.1 |
| 118 | 80.2 | 288 | 3.4 | 300 | 28.8 | 10.5 | 23.2 | 4.5 | 25.3 | 11.0 |

EXAMPLE 25

1.65 g of the catalytic composition G, diluted with corundum, are charged into a reactor (30–50 mesh) and activated in the presence of H₂S/H₂ (10% vol) up to 400° C. for 3 hours; the system is then brought under H₂ pressure up to 10 bars and the feed consisting of the full range FCC gasoline of Table 3 is sent, with an H₂/HC ratio equal to 300 Nl/l. The process conditions and results obtained are shown in the following table:

| S ppm | MON | T (° C.) | WHSV (hr⁻¹) | H₂/ charge | n + i- paraffins | naph- thenes | n + i- olefins | cyclo- olefins | aromat- ics | B.P. > 200° C. |
|---|---|---|---|---|---|---|---|---|---|---|
| 97 | 80.0 | 282 | 4.5 | 300 | 31.9 | 11.6 | 18.9 | 3 | 23.8 | 10.0 |
| 137 | 80.2 | 284 | 5.9 | 300 | 30.7 | 11.0 | 22.1 | 3.3 | 22.7 | 9.4 |
| 191 | 80.5 | 275 | 5.9 | 300 | 29.0 | 10.9 | 22.1 | 2.6 | 24.5 | 10.0 |

What is claimed is:

1. A process for the desulfuration of hydrocarbon mixtures having boiling ranges within the range of $C_4$ to 250° C., containing olefins and at least 150 ppm of sulfur, with the contemporaneous skeleton isomerization of said olefins, which comprises putting said mixtures in contact, in the presence of hydrogen, with a catalytic composition which comprises an ERS-10 zeolite, a metal of group VIII, a metal of group VI, and optionally one or more oxides as carrier to desulfurize said hydrocarbon mixture and contemporaneously skeleton-isomerize said olefins.

2. The process according to claim 1, wherein the catalytic composition comprises a metal of group II B and/or III A.

3. The process according to claim 2, wherein the metal of group II B and/or III A is deposited on the surface of the zeolite.

4. The process according to claim 1 or 2, carried out in the presence of a catalytic composition containing an ERS-10 zeolite, a metal of group VI, a metal of group VIII, and optionally a metal of group II B and/or III A, at a temperature ranging from 220 to 360° C., at a pressure ranging from 5 to 20 kg/cm², at a WHSV ranging from 1 to 10 h⁻¹, with a quantity of hydrogen ranging from 100 to 500 times the quantity of hydrocarbons present (Nl/l).

5. The process according to claim 4, carried out at a temperature ranging from 300 to 350° C.

6. The process according to claim 1 or 2 carried out in the presence of a catalytic composition containing an ERS-10 zeolite, a metal of group VI, a metal of group VIII, one or more oxides as carrier, and optionally a metal of group II B and/or III A, at a temperature ranging from 220 to 320° C., at a pressure ranging from 5 to 20 kg/cm², at a WHSV ranging from 1 to 10 h⁻¹, with a quantity of hydrogen ranging from 100 to 500 times the quantity of hydrocarbons present (Nl/l).

7. The process according to claim 6, carried out at a temperature ranging from 250 to 290° C.

8. The process according to claim 1, wherein the mixture of hydrocarbons which is subjected to desulfuration contains more than 600 ppm of sulfur.

9. The process according to claim 1 carried out in a reactor in which the catalytic composition is divided in two beds, the first containing ERS-10 zeolite, optionally containing a metal of group II B and/or III A, the second containing a metal of group VI, a metal of group VIII and one or more oxides as carrier.

10. The process according to claim 1, wherein the mixtures of hydrocarbons which are subjected to hydrodesulfuration have boiling ranges within the range of $C_5$ to 220° C.

* * * * *